(12) United States Patent
Pollet et al.

(10) Patent No.: US 11,069,335 B2
(45) Date of Patent: Jul. 20, 2021

(54) SPEECH SYNTHESIS USING ONE OR MORE RECURRENT NEURAL NETWORKS

(71) Applicant: Cerence Operating Company, Burlington, MA (US)

(72) Inventors: Vincent Pollet, Astene (BE); Enrico Zovato, Fossano (IT)

(73) Assignee: Cerence Operating Company, Burlington, MA (US)

( * ) Notice: Subject to any disclaimer, the term of this patent is extended or adjusted under 35 U.S.C. 154(b) by 0 days.

(21) Appl. No.: 15/648,022

(22) Filed: Jul. 12, 2017

(65) Prior Publication Data

US 2018/0096677 A1  Apr. 5, 2018

Related U.S. Application Data

(60) Provisional application No. 62/526,812, filed on Jun. 29, 2017, provisional application No. 62/403,771, filed on Oct. 4, 2016.

(51) Int. Cl.
| | |
|---|---|
| *G10L 13/047* | (2013.01) |
| *G10L 13/08* | (2013.01) |
| *G06F 16/24* | (2019.01) |
| *G06N 3/04* | (2006.01) |
| *G10L 13/04* | (2013.01) |
| *G10L 13/10* | (2013.01) |
| *G06N 3/02* | (2006.01) |

(Continued)

(52) U.S. Cl.
CPC ............. *G10L 13/08* (2013.01); *G06F 16/24* (2019.01); *G06N 3/02* (2013.01); *G06N 3/0445* (2013.01); *G06N 3/0454* (2013.01); *G06N 3/08* (2013.01); *G10L 13/02* (2013.01); *G10L 13/04* (2013.01); *G10L 13/10* (2013.01)

(58) Field of Classification Search
CPC ........ G10L 13/047; G10L 13/08; G10L 13/10; G10L 2013/105; G06N 3/02; G06N 3/04; G06N 3/0454
USPC ....... 704/258, 259, 260, 267; 706/15, 26, 27, 706/30
See application file for complete search history.

(56) References Cited

U.S. PATENT DOCUMENTS

| | | | |
|---|---|---|---|
| 7,567,896 B2 | 7/2009 | Coorman et al. | |
| 8,321,222 B2 * | 11/2012 | Pollet | G10L 13/07 704/258 |

(Continued)

OTHER PUBLICATIONS

"Gradient descent", Wikipedia, 16 Pages, downloaded Dec. 6, 2018. (Year: 2018).*

(Continued)

*Primary Examiner* — Martin Lerner
(74) *Attorney, Agent, or Firm* — Occhiuti & Rohlicek LLP

(57) ABSTRACT

Aspects of the disclosure are related to synthesizing speech or other audio based on input data. Additionally, aspects of the disclosure are related to using one or more recurrent neural networks. For example, a computing device may receive text input; may determine features based on the text input; may provide the features as input to an recurrent neural network; may determine embedded data from one or more activations of a hidden layer of the recurrent neural network; may determine speech data based on a speech unit search that attempts to select, from a database, speech units based on the embedded data; and may generate speech output based on the speech data.

20 Claims, 12 Drawing Sheets

(51) Int. Cl.
   G06N 3/08    (2006.01)
   G10L 13/02   (2013.01)

(56) References Cited

U.S. PATENT DOCUMENTS

| | | | | |
|---|---|---|---|---|
| 8,571,871 | B1* | 10/2013 | Stuttle | G10L 13/033 704/260 |
| 9,484,022 | B2* | 11/2016 | Gruenstein | G06N 3/0454 |
| 10,089,974 | B2* | 10/2018 | Zhao | G10L 13/086 |
| 10,127,901 | B2* | 11/2018 | Zhao | G10L 13/08 |
| 10,475,438 | B1* | 11/2019 | Chicote | G10L 13/047 |
| 10,510,000 | B1* | 12/2019 | Commons | G06N 3/0454 |
| 2005/0182629 | A1* | 8/2005 | Coorman | G10L 13/07 704/266 |
| 2007/0203863 | A1* | 8/2007 | Gupta | G06N 3/0454 706/20 |
| 2014/0358546 | A1* | 12/2014 | Fernandez | G10L 13/10 704/259 |
| 2015/0073804 | A1 | 3/2015 | Senior et al. | |
| 2015/0186359 | A1* | 7/2015 | Fructuoso | G10L 13/08 704/8 |
| 2016/0343366 | A1* | 11/2016 | Fructuoso | G10L 13/08 |
| 2016/0379112 | A1* | 12/2016 | He | G06N 3/0454 706/25 |
| 2017/0032035 | A1* | 2/2017 | Gao | G06N 3/0454 |
| 2017/0061330 | A1* | 3/2017 | Kurata | G06N 20/00 |
| 2017/0068888 | A1* | 3/2017 | Chung | G06N 3/084 |
| 2017/0091168 | A1* | 3/2017 | Bellegarda | G06N 3/0454 |
| 2017/0092259 | A1* | 3/2017 | Jeon | G10L 13/07 |
| 2017/0263237 | A1* | 9/2017 | Green | G10L 13/04 |
| 2017/0345411 | A1* | 11/2017 | Raitio | G10L 13/10 |
| 2017/0358293 | A1* | 12/2017 | Chua | G10L 13/08 |
| 2018/0060728 | A1* | 3/2018 | Shan | G06N 20/00 |
| 2018/0268806 | A1* | 9/2018 | Chun | G10L 13/047 |

OTHER PUBLICATIONS

Ding et al., "Automatic Prosody Prediction for Chinese Speech Synthesis Using BLSTM-RNN and Embedded Features", 2015 IEEE Workshop on Automatic Speech Recognition and Understanding (ASRU), Dec. 13-17, 2015, pp. 98 to 102. (Year: 2015).*

Wang et al., "Word Embedding for Recurrent Neural Network Based TTS Synthesis", 2015 IEEE International Conference on Acoustics, Speech and Signal Processing (ICASSP), Apr. 19-24, 2015, pp. 4879 to 4883. (Year: 2015).*

Rendel et al., "Using Continous Lexical Embeddings to Improve Symbolic-Prosody Prediction in Text-to-Speech Front-End", 2016 IEEE Conference on Acoustics, Speech and Signal Processing (ICASSP), Mar. 20-25, 2016, pp. 5655 to 5659. (Year: 2016).*

Jan. 26, 2018—(WO) International Search Report & Written Opinion—PC/US2017/054913.

Merritt Thomas et al: "Deep neural network-guided unit selection synthesis", 2016 IEEE International Conference on Acoustics, Speech and Signal Processing (ICASSP), IEEE, Mar. 20, 2016 (Mar. 20, 2016), pp. 5145-5149, XP032901584, [retrieved on May 18, 2016].

Zizheng Wu et al: "Improving trajectory modelling for DNN-based speech synthesis by using stacked bottleneck features and minimum generation error training", IEEE/ACM Transactions on Audio, Speech, and Language Processing, IEEE, USA, vol. 24, No. 7, Jul. 1, 2016 (Jul. 1, 2016), pp. 1255-1265, XP058281556, ISSN: 2329-9290.

Heiga Zen et al: "Fast, Compact, and High Quality LSTM-RNN Based Statistical Parametric Speech Synthesizers for Mobile Devices", arxiv.org, Cornell University Library, 201 Olin Library Cornell University Ithaca, NY 14853, Jun. 20, 2016 (Jun. 20, 2016), XP080709537.

Sudhakar Sangeetha et al: "Syllable based text to speech synthesis system using auto associative neural network prosody prediction", International Journal of Speech Technology, vol. 17, No. 2, Sep. 24, 2013 (Sep. 24, 2013), pp. 91-98, XP055438165, NL ISSN: 1381-2416, DOI: 10.1007/s10772-013-9210-8.

Raul Fernandez et al.: "Using Deep Bidirectional Recurrent Neural Networks for Prosodic-Target Prediction in a Unit-SelectionText-to-SpeechSystern", Interspeech 2015, Sep. 1, 2015 (Sep. 1, 2015), XP055438250, https://www.semanticscholar.org/paper/Using-deep-bidirectional-recurrent-neural-networks-Fernandez-Rendel/b773e253684f8a35592ecfd5047c538f66426d34.

* cited by examiner

SPEECH SYNTHESIS USING ONE OR MORE RECURRENT NEURAL NETWORKS

CROSS-REFERENCE TO RELATED APPLICATIONS

The present application claims the benefit of U.S. provisional application 62/526,812, filed Jun. 29, 2017, and having the title "Speech Synthesis"; and U.S. provisional application 62/403,771, filed Oct. 4, 2016, and having the title "Speech Synthesis Method." Each of the above-mentioned applications is incorporated herein by reference in its entirety.

TECHNICAL FIELD

The present application generally relates to synthesizing speech or other audio based on input data. Additionally, the present application relates to using one or more recurrent neural networks.

BACKGROUND

Speech synthesis systems often process textual input and generate output speech that is intended to emulate human speech. Common processes used to synthesize speech may process the textual input to determine phonetic information and prosody information. Phonetic information may include, for example, determining one or more phonemes for each word in the textual input. Prosody information may include determining prosodic units such as, for example, phrases, clauses and sentences for the textual input. Various techniques may be used to generate the speech output based on the phonetic information and the prosody information including, for example, a sample-based technique or parameter-based technique.

A sample-based technique may use a database of pre-recorded speech samples. The phonetic information and the prosody information may be used as a basis for both selecting a set of the pre-recorded speech samples and concatenating the selected set together to form the output speech. Because pre-recorded samples are used, sample-based techniques may produce natural sounding synthesized speech. The naturalness of the synthesized speech may refer to how easily the synthesized speech mimics the sound patterns of human speech. However, the overall performance of the sample-based techniques may be dependent on the size of the database of pre-recorded speech samples and/or the manner in which the pre-recorded speech samples are organized within the database and selected. Further, because the pre-recorded speech samples depend on segmentation techniques to determine the pre-recorded samples, there may be audible glitches in the synthesized speech.

A parameter-based technique does not use pre-recorded speech samples at runtime. Instead, the output speech may be generated based on an acoustic model that parameterizes human speech. One common approach is to use hidden Markov models (HMMs) to model various parameters of human speech. Parameter-based techniques may produce more intelligible synthesized speech if compared to a sample-based technique. The intelligibility of synthesized speech may refer to how easily the synthesized speech is understood. However, a parameter-based technique may produce less natural sounding synthesized speech if compared to a sample-based technique.

In light of the various drawbacks for each of the common approaches to synthesizing speech, there is an ever present need to improve on the processes for synthesizing speech.

SUMMARY

The following presents a simplified summary of various aspects described herein. This summary is not an extensive overview, and is not intended to identify key or critical elements or to delineate the scope of claims. The following summary merely presents some concepts in a simplified form as an introductory prelude to the more detailed description provided below.

To overcome the challenges discussed above, and to overcome other challenges that will be apparent upon reading and understanding the present specification, aspects described herein advantageously improve on processes that synthesize speech. Advantages provided by the techniques described herein relate to the use of recurrent neural networks (RNNs), the use of embedded data extracted from the RNNs, and the manner in which speech units may be searched for. For example, a computing device may receive text input. The computing device may determine features based on the text input. The computing device may provide the features as input to a RNN. The computing device may determine embedded data from an activation of a hidden layer of the RNN. The computing device may determine speech data based on a speech unit search that attempts to select, from a database, speech units based on the embedded data. Finally, the computing device may cause speech output to be generated based on the speech data. Other aspects described herein relate to the various arrangements of the RNNs, the various uses of the embedded data, and the manner in which the speech unit search is performed.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various implementations, reference is made to the accompanying drawings identified above and which form a part hereof, and in which is shown by way of illustration various implementations in which aspects described herein may be practiced. It is to be understood that other implementations may be utilized and structural and functional modifications may be made without departing from the scope described herein. Various aspects are capable of other implementations and of being practiced or being carried out in various different ways.

As a general introduction to the subject matter described in more detail below, aspects described herein are directed toward synthesizing speech by, for example, processing textual input and generating output speech.

As described in further detail below, one or more recurrent neural networks (RNNs) may be used to determine speech data based on text input. An RNN is a type of neural network where connections between nodes are weighted and form a directed cycle. In an LSTM-RNN, the nonlinear hidden units of a conventional RNN are replaced by memory blocks that each include one or more self-connected memory cells and three multiplicative units (input, output and forget gates). The multiplicative units provide the memory cells with analogues of write, read and reset operations. For clarity of the discussion, the embodiments discussed throughout this disclosure will be discussed in terms of LSTM-RNNs. However, various types of RNNs may be used in the described embodiments including, for example variants on memory cell sequencing operations (e.g., bidirectional, unidirectional, backward-looking unidirectional, or forward-looking unidirectional with a backward-looking window) or variants on the memory cell type (e.g., LSTM variants or gated recurrent units (GRU)). In a BLSTM-RNN, output depends on both past and future state information. Further, the gates of the multiplicative units allow the memory cells to store and access information over long sequences of both past and future events. Additionally, other types of positional-aware neural networks, or sequential prediction models, could be used in place of the LSTM-RNNs or BLSTM-RNNs. The types of neural networks or prediction models that could be used will be apparent based on the discussion of the embedded data that is extracted from one or more hidden layers of the LSTM-RNNs.

Figure 2:
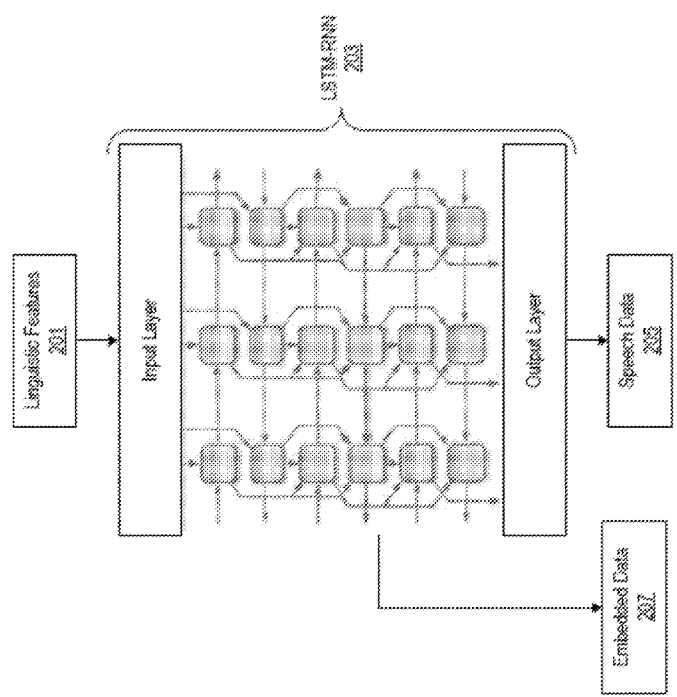
FIG. 2 depicts an example flow that uses one long short term memory (LSTM) recurrent neural network (RNN) for determining speech data and extracting embedded data from one or more hidden layers of the RNN according to one or more aspects described herein.

As depicted throughout this disclosure, an LSTM-RNN includes an input layer, an output layer, and one or more hidden layers. In particular, two different abstractions of the hidden layers are shown. For example, FIG. 2 illustrates the hidden layers of the LSTM-RNN as an interconnected network. FIGS. 5, 8, 9, 11 and 12 illustrate the hidden layers as an arbitrary number of hidden layers (e.g., each LSTM-RNN has i, j or k hidden layers). The LSTM-RNN, via a training process, provides a model that predicts a set of parameters based on a set of input linguistic features. These predictions may be made, for example, at the phoneme, state-level or the frame-level. The state-level may be considered a phoneme sub-unit. The frame-level may be considered a basic constant temporal interval for which acoustic parameters are available. A frame can also be interchangeably referred to herein as an acoustic frame. Additional details of an LSTM-RNN will be discussed below.

For illustrative purposes, four different embodiments in which LSTM-RNNs can be used to synthesize speech will be described below. For example, one embodiment includes a single LSTM-RNN that performs a mapping from linguistic features to speech data, and from which embedded data may be extracted. In some variations, the speech data may include acoustic parameters, speech descriptors and/or speech unit identifiers. Additionally, in some variations, the embedded data may include speech unit embeddings (SUEs). The first embodiment is described in connection with FIG. 2. A second embodiment includes two stages of LSTM-RNNs: a first LSTM-RNN that may be used in connection with determining a first set of speech data and with determining a set of selected speech units, or other speech descriptor, that may describe the unstructured information of the input text; and a second LSTM-RNN that may be used in connection with determining a second set of speech data based on the set of selected speech units. The second embodiment is described in connection with FIGS. 5-6. A third embodiment also includes two stages of LSTM-RNNs: a first LSTM-RNN from which embedded data may be used as input for a speech unit search, and as input to a second LSTM-RNN. The fourth embodiment includes a tiered arrangement that uses plural LSTM-RNNs. The third and fourth embodiments are described in connection with FIGS. 7-12.

In the embodiments described throughout this disclosure, the embedded data extracted from one or more hidden layers of an LSTM-RNN may be used as a basis for performing a speech unit search. In particular, the embedded data may include one or more SUEs, which may be organized as a vector (e.g., an SUE vector). For example, an SUE vector may be extracted or otherwise determined from activations of a hidden layer from an LSTM-RNN. With respect to the embodiments described herein, an SUE vector may encode both symbolic and acoustic information associated with speech units. For example, the vector of SUE may encode dynamic information that describes both future state information and past state information for a speech unit and may encode mapping information between linguistic features to acoustic features. In some arrangements involving a BLSTM-RNN, the SUE vector may further include contextual information based on the forward and backward passes of an BLSTM. In the BLSTM, the forward pass may read speech descriptive data having a sequence of T sub-units forward from 1 to T; and the backward pass may read the speech descriptive data from T to 1. Due to the SUE vector being extracted from an intermediate layer in the BLSTM-RNN, the exact content of the SUE may be unknown and, thus, the SUE vector may be considered information that is both deep in time and space. In other words, the SUE vector includes information that is unstructured (e.g., deep in space) and that indicates one or more temporal effects in the future and past (e.g., deep in time).

Figure 4:
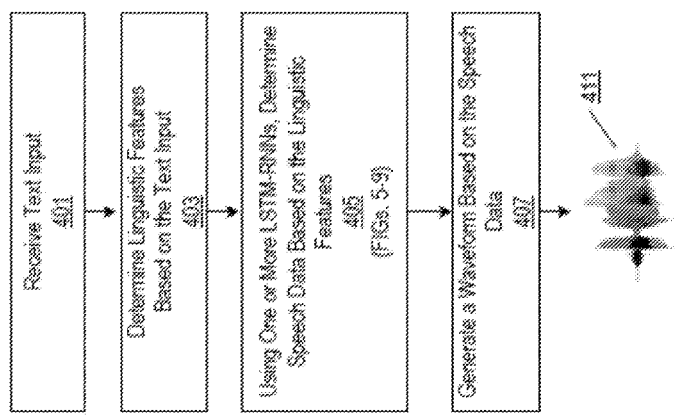
FIG. 4 depicts an example method for synthesizing speech using one or more LSTM-RNNs according to various aspects described therein.

Taken together, the four illustrative embodiments may provide for aspects of a general framework for synthesizing speech using a neural network graph in which one or more LSTM-RNNs are present. Based on the general framework, other embodiments and variations will be apparent. FIG. 4 depicts a method that relates to the general framework. In particular FIG. 4 illustrates an example method that synthesizes speech based on one or more LSTM-RNNs. Each of the four embodiments described throughout this disclosure provides additional details to the example method of FIG. 4.

Additionally, in connection with the embodiments described throughout this disclosure, various improvements to the selection of speech units will become apparent. In conventional processes, speech unit selection may include complex decisions with multiple branching paths. For example, conventional speech unit selection may be employ heuristics on phonetic context, syllable context, stress, word prominence and work break indexes. In one more particular example, a fixed window of features may be used and include features such as previous phoneme, previous word prominence level and current word prominence level. To improve the performance at runtime, the speech unit selection may require, for each voice, tuning, formulation or other hand-crafting by a human. For these conventional speech unit selection processes, problems when the input text has complex structure and prosody. If the speech unit selection was not tuned or formulated for high complexity text input, the resulting speech output may be sub-optimal. Moreover, it becomes infeasible for a human to accurately tune or formulate the speech unit selection in view of the mutual influence of the linguistic features within the high complexity text input associated with natural, expressive speech.

Further, example methods and arrangements for training the LSTM-RNN(s) and annotating a database for performing a speech unit search will be discussed. Example experimental results and/or a comparison to a reference speech synthesis system will also be discussed. Indeed, an example for training a LSTM-RNN is described in connection with FIG. 3. One or more examples for training a tiered arrangement of LSTM-RNNs and preparing the tiered arrangement of LSTM-RNNs for runtime will be discussed in connection with FIGS. 10-12.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging. In addition a "set" as used in this description refers to a collection of one or more elements. Furthermore non-transitory computer-readable media refer to all types of computer-readable media with the sole exception being a transitory propagating signal.

Figure 1:
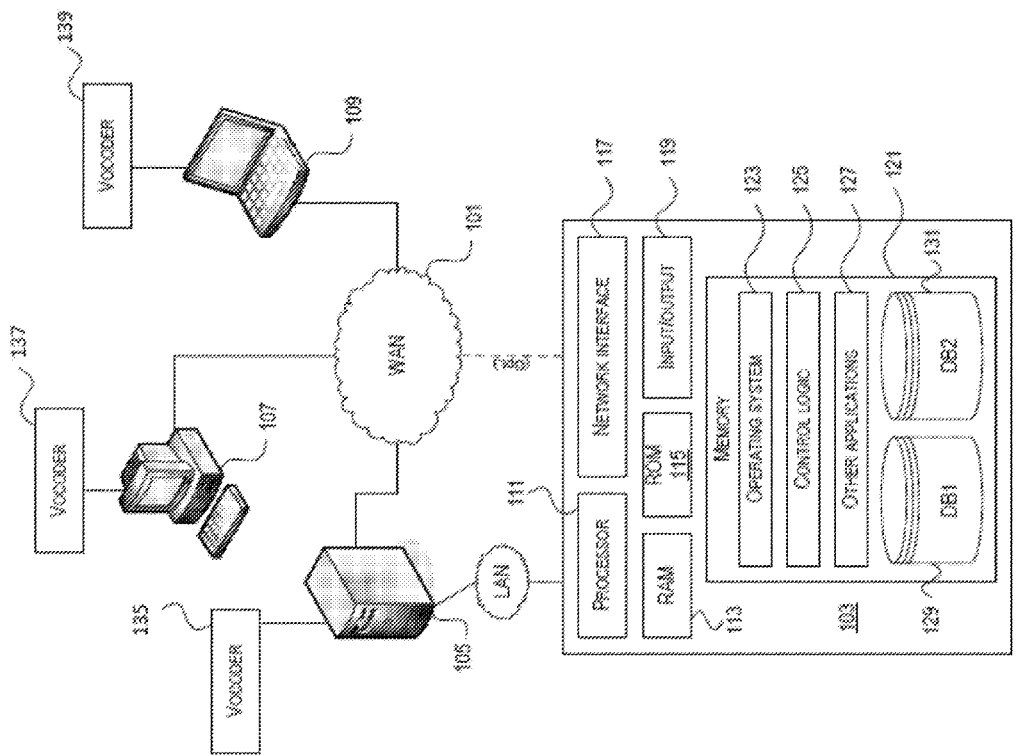
FIG. 1 depicts an illustrative computer system architecture that may be used in accordance with one or more illustrative aspects described herein.

FIG. 1 illustrates one example of a network architecture and data processing device that may be used to implement one or more illustrative aspects of the disclosure. Various network nodes 103, 105, 107, and 109 may be interconnected via a wide area network (WAN) 101, such as the Internet. Other networks may also or alternatively be used, including private intranets, corporate networks, LANs, wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects of the disclosure as described herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. I/O 119 may further include one or more parametric synthesizers, which generates audio based on a set of acoustic parameters such as, for example, fundamental frequency (f0), duration and one or more spectral parameters. One type of a parametric synthesizer is a vocoder. Further details of the text input, the processing of the text input, and the generated audio will be discussed below.

Memory 121 may further store operating system software 123 for controlling overall operation of the data processing device 103, control logic 125 for instructing data server 103 to perform aspects of the disclosure as described herein, and other application software 127 providing secondary, support, and/or other functionality which may or might not be used in conjunction with aspects of the present disclosure. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects of the disclosure, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Further, for illustrative purposes, devices 105, 107 and 109 are shown in communication with vocoders 135, 137 and 139, respectively. Vocoder 135 may be configured to generate audio for device 105. Vocoder 137 may be configured to generate audio for device 107. Vocoder 139 may be configured to generate audio for device 109. Additionally, those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

FIG. 2 depicts an example flow that uses one LSTM-RNN for determining speech data. In the illustrated flow, the LSTM-RNN 203 performs a mapping from linguistic features 201 to speech data 205. As illustrated in FIG. 2, the linguistic features 201 are input to LSTM-RNN 203. LSTM-RNN 203 processes the linguistic features 201 via an input layer, one or more hidden layers, and an output layer. The LSTM-RNN 203 outputs the speech data 205 via the output layer. The mapping is performed by the model of the LSTM-RNN 203. The mapping can also be referred interchangeably as a prediction. Thus, as illustrated, the model of the LSTM-RNN 203 predicts speech data 205 based on linguistic features 201.

As will become apparent from the discussion of the various embodiments throughout this disclosure, the speech data 205 may take the form of, or otherwise include, various types and/or unit levels of speech data. An LSTM-RNN may be configured to output acoustic parameters, speech units or other speech descriptors. In some variations, the model of the LSTM-RNN 203 may predict descriptive data for prosody, excitation or spectrum. Prosody parameters (e.g., f0, duration) and excitation parameters (e.g., maximum voicing frequency) may be predicted at the state-level or frame-level. State alignment may be provided by an HMM forced alignment. Spectrum parameters (e.g., Mel Regularized Cepstral Coefficients (MRCC)) may be predicted at the frame-level. For the state-level, a state unit may include a variable number of frames based on the state duration. A LSTM-RNN may further predict data at the unit level, such as data describing characteristics of, or otherwise identifying, a single phoneme.

The model of the LSTM-RNN 203 may initially predict the prosody parameters and excitation parameters. The duration parameters may be used to generate frame-level input for the spectrum parameter prediction. The exact configuration of the network may depend on a number of factors including, for example, the used feature set, the voice being modeled, and the language of the voice being modeled. In at least one variation, the configuration of layers for predicting the prosody parameters and excitation parameters can be as follows: 171 linguistic features may be input, which may be unrolled to 574 input values representing one-hot vectors for categories and numerical features; three hidden layers with sizes of 68, 58 and 46; 7 acoustic parameters may be output including, for example, one or more parameters for various original, first order and second order derivatives. In some arrangements, the acoustic parameters may include fundamental frequency (f0), the change in fundamental frequency between acoustic frames (Δf0), the acceleration in fundamental frequency between the acoustic frames (ΔΔf0), the variance in fundamental frequency (varf0), the variance of Δf0 (varΔf0), the variance of ΔΔf0 (varΔΔf0), and duration. In some variations, the configuration of layers for predicting the spectrum parameters can be as follows: 173 linguistic features may be input, which may be unrolled to 574 input values representing one-hot vectors and numerical features; three hidden layers with sizes of 120, 100 and 90; 34 acoustic parameters may be output including an MRCC vector, the change in MRCC between acoustic frames (ΔMRCC), and the acceleration in MRCC between acoustic frames (ΔΔMRCC).

Embedded data 207, which may be a vector of SUEs, may also be extracted from one of the hidden layers of the LSTM-RNN 203. Multiple LSTM layers may be stacked to get deep annotations in the SUE. For example, a SUE, $s_t$, for a given sequence of input, $u_t$, may be determined by concatenating the forward hidden layer state, $\overrightarrow{h_{t,i}}$, and the backward hidden state, $\overleftarrow{h_{t,i}}$, which can be denoted as $[\overrightarrow{h_{t,i}} \overleftarrow{h_{t,i}}]$. Thus, $s_t$ summarizes the deep information at a bidirectional LSTM layer of index i of the entire text input centered around $u_t$. The SUE determination may be summarized as follows:

$$x_t = \text{lingcode}(u_t), t \in [1,T]$$

$$\overrightarrow{h_{t,1}} = \overrightarrow{lstm}(x_t), t \in [1,T]$$

$$\overleftarrow{h_{t,1}} = \overleftarrow{lstm}(x_t), t \in [1,T]$$

$$h_{t,1} = [\overrightarrow{h_{t,1}} \overleftarrow{h_{t,1}}]$$

$$\overrightarrow{h_{t,i}} = \overrightarrow{lstm}(h_{t,(i-1)}), t \in [1,T]$$

$$\overleftarrow{h_{t,i}} = \overleftarrow{lstm}(h_{t,(i-1)}), t \in [T,1]$$

$$s_t = h_{t,n} = [\overrightarrow{h_{t,i}}, \overleftarrow{h_{t,i}}]$$

In the above summarization, linguistic features 201 may be considered as being equivalent to $x_t$.

Once extracted from the LSTM-RNN 207, the embedded data 207 may be processed to select or otherwise determine one or more matching speech units stored within a database. Additional details of the embedded data, SUEs and the manner in which particular embedded data 207 may be determined and used will be discussed below in connection with the remaining figures.

Figure 3:
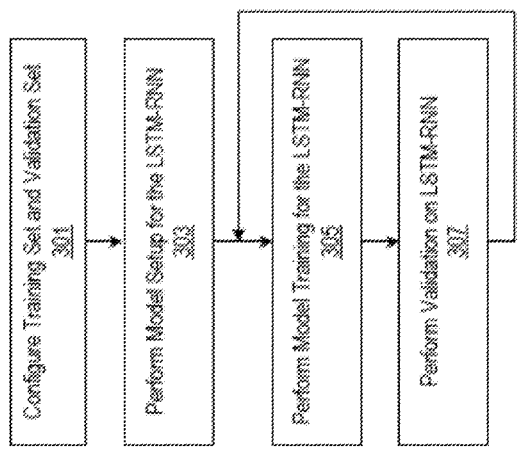
FIG. 3 depicts an example method for training an LSTM-RNN according to one or more aspects described herein.

A training process configures the model of a LSTM-RNN. FIG. 3 depicts an example method for training an LSTM-RNN. In some variations, the training process may be performed using specialized software (e.g., Tensforflow script, the CURRENNT toolkit, or a modified version of an off-the-shelf toolkit) and/or specialized hardware (e.g., an NVIDIA Tesla k80 GPU card).

At step 301, a computing device may configure a training set and a validation set for training and validating the LSTM-RNN. The training set and the validation set may be configured based on user selections from a corpus of speech data. In some variations, the training set may include 85% of the corpus of speech data and the validation set may include the remaining 15% of the corpus of speech data. The corpus of speech data may be interchangeably referred to as a speech base or a synthesizer speech base.

In some arrangements, the corpus of speech data may include a large set of speech utterances (e.g., greater than 10,000) from an American English female speaker. The speaking style may be conversational with controlled articulation, rhythm and speaking regularity. The script that the female speaker used may have been designed to provide contextual phonetic coverage. Domain specific sentences may be included, depending on the application for the speech synthesizer. For example, car navigation prompts, weather forecast messages, greetings, numbers, questions, etc., may be included in the scripts. With respect to the training and validation sets, a set of out-of-training data may be reserved to assess objectively the accuracy of the models by comparing predicted streams with recorded data.

At step 303, the computing device may perform model setup for the LSTM-RNN. Model setup may include initializing the weights of the connections for the LSTM-RNN. In some arrangements, pre-training may be performed to initialize the weights. In others, the weights may be initialized according to a distribution scheme. One distribution scheme includes randomizing the values of the weights according to a normal distribution with mean equal to 0 standard deviation equal to 0.1.

At step 305, the computing device may perform model training on the LSTM-RNN. In some variations, the model training may include performing one or more training techniques including, for example, steepest descent, stochastic gradient descent, or resilient backpropagation (RPROP). The training technique applies the training set to the model and adjusts the model. To speed up the model training, parallel training may be performed. For example, the training set may be split into batches of 100 sequences that are processed in parallel with other batches.

At step 307, the computing device may perform model validation on the LSTM-RNN. In some variations, the validation set may be applied to the trained model and heuristics may be tracked. The heuristics may be compared to one or more stop conditions. If a stop condition is satisfied, the training process may end. If none of the one or more stop conditions are satisfied, the model training of step 305 and validation of step 307 may be repeated. Each iteration of steps 305 and 307 may be referred to as a training epoch. Some of the heuristics that may be tracked include sum squared errors (SSE), weighted sum squared error (WSSE), regression heuristics, or number of training epochs. Additional details on the specific stop conditions and training processes will be discussed in connection with the embodiments described throughout this document.

With respect to training the LSTM-RNN 203 of FIG. 2, the training may be performed in two passes. In the first pass, steepest descent may be used with a stop condition based on a heuristic of WSSE. In the second pass, RPROP may be used.

As discussed above, the four illustrative embodiments described throughout this disclosure, taken together, may provide for aspects of a general framework for synthesizing speech using a neural network graph in which one or more LSTM-RNNs are present. The example method of FIG. 4 relates to the general framework. In particular, FIG. 4 depicts an example method for synthesizing speech using one or more LSTM-RNNs. Additionally, each of the four embodiments described throughout this disclosure provides additional details for, as described in connection with step 405 of FIG. 4, determining speech data using the one or more LSTM-RNNs. This association between step 405 of FIG. 4 and the four embodiments is depicted in the FIGs by including a representation of step 405 in each of FIGS. 5-9.

Additionally, for simplicity, the discussion of the remaining FIGs will be discussed in terms of various methods, steps and other aspects as being performed by a computing device. The various methods, steps and other aspects described herein may be operative across one or more computing devices and one or more networks. The functionality may be distributed in any manner, or may be located in a single computing device (e.g., a server, a client computer, or the like).

At step 401, a computing device may receive text input. The text input may, in some variations, be received following user interaction with an interface device or generated as part of an application's execution. For example, a user may enter a string of characters by pressing keys on a keyboard and the text input may include the string of characters. As another example, as an application executes, the application may, based on the occurrence of some event, generate a string of characters and the text input may include the string of characters. In general, the text input may include, for example one or more characters, words, phrases, sentences, and the like.

At step 403, the computing device may determine linguistic features based on the text input. In general, this determination may be performed by analyzing the text input, extracting features and generating data that describes one or more types of linguistic features that are identified during the analysis and the feature extraction. Linguistic features may include data that describes various aspects of speech and/or other data that is usable for synthesizing speech. Indeed, linguistic features may include symbolic, lexical, phonetic, prosodic, syntactic, orthographic, contextual, positional and count features. Linguistic features may include orthographic words or identifiers to a dictionary of orthographic words, or other encodings of word data. In some variations there may be more than 50 different types of linguistic features. For example, different types of the linguistic features may include phoneme, syllable, word, phrase, phone identity, part-of-speech, phrase tag, stress, number of words in a syllable/word/phrase, compounds, document class, other utterance-level features, etc. Other types of linguistic feature may be apparent based on the discussion of the embodiments of this document.

Additionally, some values of the linguistic features may be numeric, and other values may be category-based or class-based. Numeric features may include syllable counts, phone counts, etc. For the numeric feature values, a standardization process may be performed so that distances are standardized to zero mean and unit variance. Category-based or class-based features may include phone label, lexical stress, phrase type, prosodic boundary-type, part or speech, etc. For the category-based or class-based feature values, an unroll process may be performed (e.g., determining a Boolean variable for each value of the category). Once the unroll process is complete, a category value in a set of N categories may be encoded within an array, or vector, of N boolean variables. In some variations, a particular array or vector may be encoded as a one-hot vector (e.g., only one value is set to logic high with all others set to logic low). Thus, in view of the unrolling, the number of different types of linguistic features may be different than the number of input values for an LSTM-RNN. Indeed, in one example, 148 linguistic features may be unrolled such that an input layer to an LSTM-RNN includes 355 input values.

As a further example of how the linguistic features may be determined, assume the text input includes a sequence of T sub-word units, $u_t$, as represented by the following formula:

$$u_t, t \in [1,T]$$

The T sub-word sequences may be converted to a sequence of fixed sized vectors, $x_t$, based on a linguistic encoding function, lingcode, as represented by the following formula:

$$x_t = \text{lingcode}(u_t)$$

The linguistic encoding function may annotate, or otherwise associate, each sub-word unit with orthographic, syntactic, prosodic and/or phonetic information. The categorical features may be unrolled and encoded as one-hot vectors or sub-vectors. Word representations, which may be encoded as one-hot vectors or word embeddings, may be repeated for all sub-word units.

As will become apparent based on the discussion of the following embodiments, further annotations or associations may be performed by the LSTM-RNNs. For example, contextual features may be omitted from the resulting $x_t$, but associated with the speech units by the BLSTM-RNNs. As a particular example, in connection with generating the target speech units, a LSTM-RNN may be used to generate target speech units (e.g., a speech unit embedding vector) that are associated with information from the forward and backward functions of the LSTM-RNN.

Additionally, while the embodiments described in connection with FIGS. 5-9, 11 and 12 are illustrated and described as the linguistic features being input to one or more LSTM-RNNs, in some variations, the input layer of the one or more LSTM-RNNs may perform a part of or all of the determination of the linguistic features. In other words, the input to the LSTM-RNNs may be the text input and one or more input layers may perform the determination at step 403 of FIG. 4. In further variations, the input to the LSTM-RNNs may be unrolled linguistic features and one or more input layers may perform the unrolling process discussed as part of the determination at step 403 of FIG. 4.

At step 405, the computing device may, using one or more LSTM-RNNs, determine speech data based on the linguistic features. This determination may be performed in various ways that are conditioned upon numerous factors regarding the LSTM-RNN(s) including the number of LSTM-RNNs, the manner in which the LSTM-RNNs are interconnected, and the configuration of the LSTM-RNNs. Further details of the various ways in which this determination may be performed will be discussed in connection with FIGS. 5-9. At a general level, the embodiments of FIGS. 5-9 use plural LSTM-RNNs to perform a prediction of speech data from linguistic features to speech data. The prediction may include performing a speech unit search that returns data usable for determining the speech data. Further details related to performing the speech unit search process will be discussed in connection with FIGS. 5-9.

In some variations, the speech data may include acoustic parameters, a sequence of speech unit identifiers, or other speech descriptors. The sequence of speech unit identifiers may be the result of a search of a speech unit database. In some arrangements, the acoustic parameters may include acoustic frame-sized features including, for example, high resolution, dimensional spectral parameters (e.g., mel regularized cepstral coefficients (MRCC)); high resolution fundamental frequency; duration; high resolution excitation (e.g., maximum voicing frequency); one or more other prosodic parameters (e.g., log-fundamental frequency (log-f0) or pitch); one or more other spectral parameters (e.g., mel cepstral vectors with first and second order derivatives, parameters for providing a high detailed multi-representational spectral structure); or any other parameter encoded by one of the LSTM-RNNs. Indeed, different embodiments may include different configurations of the acoustic parameters (e.g., a set based on the parameters supported by or expected by a particular vocoder). Further details of the types of speech data that may result from the determination at step 405 will be discussed in connection with FIGS. 5-9.

The speech unit database may include data for a plurality of speech units. For example, the speech unit database may include a sequential listing of speech units with each unit having its own label. The labeling scheme may be sequential in nature (e.g., 1, 2, 3, etc.) or another scheme that provides unique labels for each speech unit. For each speech unit, the speech unit database may associate an offset (e.g., a value that points to a position in a waveform) and a duration. As will be discussed in greater detail below, the speech unit database may further associate each speech unit with at least one instance of embedded data (e.g., each speech unit is associated with a vector of SUEs).

At step 407, the computing device may generate or otherwise determine a waveform based on the speech data. Determining the waveform may include concatenating speech data together based on a time domain overlap and add technique. Some techniques for performing the concatenation include Waveform Similarity and Overlap Add (WSOLA) or Pitch Synchronous Overlap and Add (PSOLA).

In some embodiments, the generation of the waveform may be performed by a vocoder. Thus, the speech data may be transmitted to the vocoder by the computing device to initiate the determination of step 407. Additionally, prior to transmitting the speech data to the vocoder, the speech data may be further processed. For example, the speech data may be processed via prosody manipulation. One example of prosody manipulation includes manipulating prosody of the speech data based on output from one of the LSTM-RNNs. For example, the prosody of the speech data may be manipulated based on the target prosody features determined by an LSTM-RNN of FIG. 8. As another example, the prosody of the speech data may be manipulated based on the target duration and/or the target prosody (e.g., pitch) features determined by two of the LSTM-RNNs of FIG. 9. The generation of the waveform may be performed by a vocoder (e.g., vocoder 135 of FIG. 1), or other type of parameterized synthesizer. Further, the generation may produce audio of the synthesized speech. The audio of the synthesized speech is represented at audio 411 of FIG. 4.

The remaining portions of this disclosure will discuss various example embodiments that include one or more LSTM-RNNs and are intended to provide additional details to the various steps, functions or other aspects that may be performed in connection with the method of FIG. 4.

Figure 5:
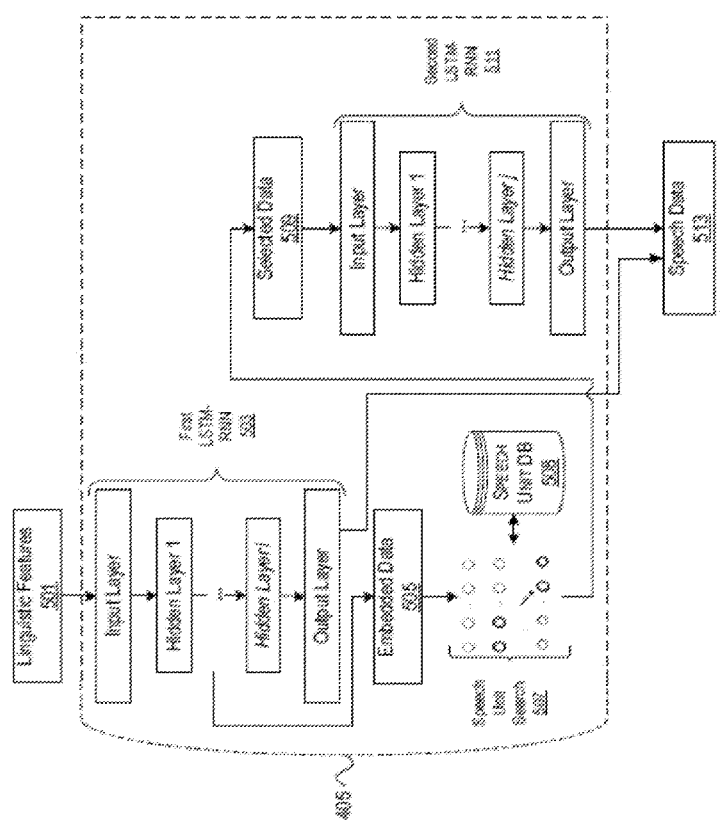
FIG. 5 depicts an example flow that uses two stages of LSTM-RNNs for determining speech data according to one or more aspects described herein.

FIG. 5 depicts an example flow that uses two stages of LSTM-RNNs for determining speech data. In the illustrated flow, the two stages of LSTM-RNNs include an encoding stage and a decoding stage. The encoding stage includes the first LSTM-RNN 503, and the decoding stage includes the second LSTM-RNN 511.

The first LSTM-RNN 503 processes linguistic features 501 and, as output, predicts a first subset of the speech data 513. In particular, the linguistic features 501 are input to a first LSTM-RNN 503. The first LSTM-RNN 503 processes the linguistic features 501 via an input layer, one or more hidden layers, and an output layer. The first LSTM-RNN 503 is shown as having i hidden layers. Embedded data 505 may be extracted from activations of one of the hidden layers of the first LSTM-RNN 503. The output layer of the first LSTM-RNN 503 provides a first subset of the speech data 513. The first subset may be at the unit-level.

The predictions of the first LSTM-RNN 503 may be at the unit-level, which may be smaller than a word (e.g., a diphone, phone, half-phone or demi-phone). The unit-level may the same size as the state-level. However, in some variations, the unit-level may be a different size than the state-level.

The embedded data 505, in some variations, may be one or more vectors of SUEs. In such arrangements, the one or more vectors of SUEs may be denoted as $S_{Q \times N}$ with Q being the row index of feature dimensionality and N being the column index of time step. For example, with respect to embedded data extracted from an BLSTM, the use of the bidirectional structures in the hidden layers may allow for contextual information from both past and future inputs to influence the prediction at every time step. For example, the part-of-speech feature of a future word can influence a prosody feature at the same time as the stress of the previous phoneme. Within the first LSTM-RNN 503, several hidden layers may be stacked to create computationally deep models. Thus, the one or more vectors of SUEs at each time step may be the result of deep activations within the hidden layers.

The embedded data (e.g., the vector of SUEs) may be used as input for a speech unit search 507. The speech unit search 507 output, selected data 509, may be used to generate acoustic frame-level parameters via the second LSTM-RNN 511. The speech unit search 507 determines the selected speech units 509 by attempting to match the embedded data 505 to speech units within speech unit database 508. The speech unit search 507 may be implemented as a dynamic programming optimization that determines the selected data 509 by computing the arguments that minimize a loss function. In some arrangements, the dynamic programming optimization may simplify the probability of boundary co-occurrences to a Boolean speech unit adjacency metric based on the embedded data 505 and, due to the nature of an LSTM-RNN, an assumption of smoothness for the speech data.

An example dynamic programming optimization can be denoted as follows:

$$C^* = \underset{C}{\arg\min} F(S, C)$$

where the selected data 509 is denoted as $C^*$; the loss function is denoted as F; the embedded data 505 is denoted as S; and the speech units within the speech unit database 508 are denoted as C. The loss function may include a target loss function, $F^T$, and a connection loss function, $F^C$. Thus, the loss function may be denoted as:

$$F(S, c \in C) = \sum_{i=1}^{N} F^t(S_i, c_i) + Q \sum_{i=2}^{N} F^c(c_{i-1}, c_i)$$

where Q is a regularization variable for balancing the contribution of the connection loss. The target loss function may be a cosine distance metric, such as the following:

$$F^t(s, c) = \left| \frac{\vec{v}_s \cdot \vec{v}_c}{\sqrt{\vec{v}_s \cdot \vec{v}_c} \sqrt{\vec{v}_c \cdot \vec{v}_c}} - 1 \right|$$

The connection loss function may be a co-occurrence based metric determined by applying a class of boundary functions, r, to edges of speech units, such as the following:

$$F^C(c_{i-1}, c_i) = -\log P(r_L(c_i) | r_R(c_{i-1}))$$

The selected speech units 509 are input into a second LSTM-RNN 511. The second LSTM-RNN 511 predicts a second subset of the speech data 513 based on the selected speech units 509. The second LSTM-RNN 511 processes the selected data 509 via an input layer, one or more hidden layers, and an output layer. The second LSTM-RNN 511 is shown as having j hidden layers. The second LSTM-RNN 501 outputs the second subset of speech data 513. Thus, as illustrated the model of the second LSTM-RNN 511 predicts the second subset of speech data 513 based on the selected data 509.

The prediction of the second LSTM-RNN 511 may be at the frame-level. A duration parameter in the selected data 509 may determine the extrapolation of the selected speech units 509 from unit to frame resolution by appending frame positional features relative to unit duration. Within the second LSTM-RNN 511, several hidden layers may be stacked to create computationally deep models.

Training of the LSTM-RNNs of FIG. 5 may be performed by performing the example method of FIG. 3 for each of the first LSTM-RNN 503 and the second LSTM-RNN 511. An example method for preparing the LSTM-RNNs for runtime (e.g., annotating the speech unit database 508) will be discussed in connection with FIG. 10.

In controlled experiments, the arrangement depicted by FIG. 5 showed improvements over the performance of the arrangement depicted by FIG. 2 (e.g., the reference synthesis system). For achieving the following experimental results, an experimental arrangement similar to FIG. 5 was prepared and configured in the following manner. For model setup, the weights of both LSTM-RNNs were randomized according to a normal distribution of [−0.1, 0.1]. Both LSTM-RNNs were trained using a stochastic gradient descent technique with a stop condition based on WSSE targets and regression targets. To avoid overfitting, the training iterations were stopped after 20 iterations without improvement in the performance of the validation set. The speech data included a training set of approximately 84% of the corpus of speech data, a validation set of approximately 15% of the corpus of speech data, and a set of out-of-training data of approximately 1% of the corpus of speech data (e.g., for a corpus of more than 10,000 utterances, 179 were set aside as out-of-training data to objectively analyze the performance).

The first LSTM-RNN (e.g., LSTM-RNN 503) included four hidden BLSTM layers. The linguistic features included categorical features encoded in binary variables (e.g. phone identity, prominence mark, part-of-speech), and numerical features accounting for linguistic contexts (e.g., the position of the phone in the parent syllable or word, the number of syllables in the phrase). In total, 311 unrolled input values were fed in the input layer of the LSTM-RNN 503. The target speech units may be determined by backward and forward activations of the third hidden layer within the first LSTM-RNN. The first subset of the speech data are at the unit-level and each unit included average regularized mel-cepstral coefficients (34 values), average log F0, variance of log F0 and unit duration.

The second LSTM-RNN of the experimental arrangement (e.g., LSTM-RNN 511) included three hidden BLSTM layers. The selected data was replicated for the number of frames within the unit and appended with two numerical features accounting for the position of the current frame in the current unit and the position of the current frame in the current phoneme. The second subset of the acoustic parameters included frame-level acoustic parameters such as the mel-cepstral coefficients, the maximum voice frequency, log F0 together with its first and second order derivative, and a voicing flag. These frame-level acoustic parameters were provided to a vocoder for generating speech output.

In the following table, the results of objective analysis are reported for log-f0, as compared between the baseline LSTM-RNN of an arrangement similar to FIG. 2 ("Baseline LSTM-RNN) and the experimental arrangement similar to FIG. 5 ("LSTM-RNN encoder-decoder"). The results were determined based on the set of out-of-training data and compared with the log-F0 of the reference data (i.e. parameterized recordings from the speaker). The table reports Weighted Root Mean Square Errors (WRMSE) whereby the weight equals 0 for unvoiced regions, Cross-correlation (XCORR) and normalized variance (NVAR).

| System | WRMSE | XCORR | NVAR |
|---|---|---|---|
| Baseline LSTM-RNN | 0.1017 ± 0.0305 | 0.7922 ± 0.1488 | 0.7393 ± 0.2489 |
| LSTM-RNN encoder-decoder | 0.1116 ± 0.0347 | 0.7213 ± 0.1879 | 0.6809 ± 0.2238 |

From the above, it is shown that both systems have similar performance for log-f0 prediction (a small increase of WRMSE for the encoder-decoder network). The advantage of the arrangement in FIG. 5 becomes clear when the selected speech units 509 is larger. This system feature may be particularly useful when rendering a domain specific prompt. The following table shows results for the same two arrangements for an experiment in which 162 prompts were synthesized.

| System | WRMSE | XCORR | NVAR |
|---|---|---|---|
| Baseline LSTM-RNN | 0.0966 ± 0.0286 | 0.8268 ± 0.1132 | 0.7589 ± 0.2655 |
| LSTM-RNN encoder-decoder | 0.0891 ± 0.0246 (+7.8%) | 0.8399 ± 0.0921 | 0.7237 ± 0.2197 |

An analysis of spectral prediction quality is shown on the same set of out-of-training data in the following table, which shows the arrangement of FIG. 5 outperforming that of FIG. 2.

| System | MCD |
|---|---|
| Baseline LSTM-RNN | 10.1968 ± 0.5919 |
| LSTM-RNN encoder-decoder | 5.8269 ± 0.3137 (+43%) |

Duration prediction was found to have similar performances between the arrangements of FIG. 2 and FIG. 5.

| System | RMSE | XCORR | NVAR |
|---|---|---|---|
| Baseline LSTM-RNN | 0.0389 ± 0.0139 | 0.7291 ± 0.1109 | 0.4253 ± 0.1780 |
| LSTM-RNN encoder-decoder | 0.0386 ± 0.0140 | 0.7575 ± 0.1309 | 1.0595 ± 0.5479 |

For subjective analysis, a preference test was performed using 30 English-native test subjects. The test stimuli included 20 randomly synthesized sentences, and the subjects were asked their preference. 46% of the test subjects preferred the synthesized sentences from the arrangement of FIG. 5; 34% of the test subjects preferred the synthesized sentences from the arrangement of FIGS. 2; and 20% had no preference.

Figure 6:
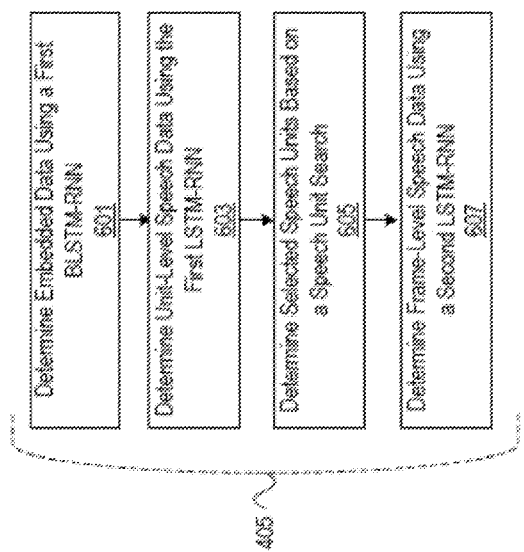
FIG. 6 depicts an example method for determining speech data based on the two stages of LSTM-RNNs according to various aspects described herein.
Figure 7:
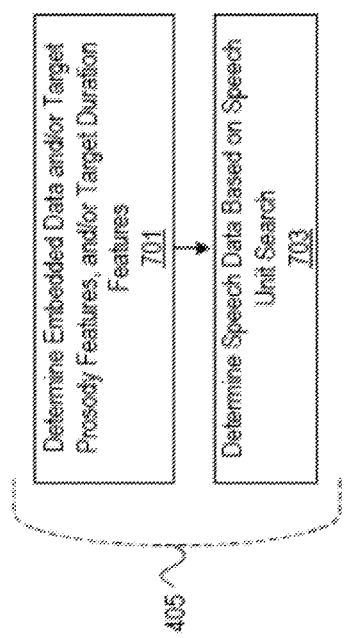
FIG. 7 depicts an example method for determining speech data based on use of a tiered arrangement of LSTM-RNNs according to various aspects described herein.
Figure 8:
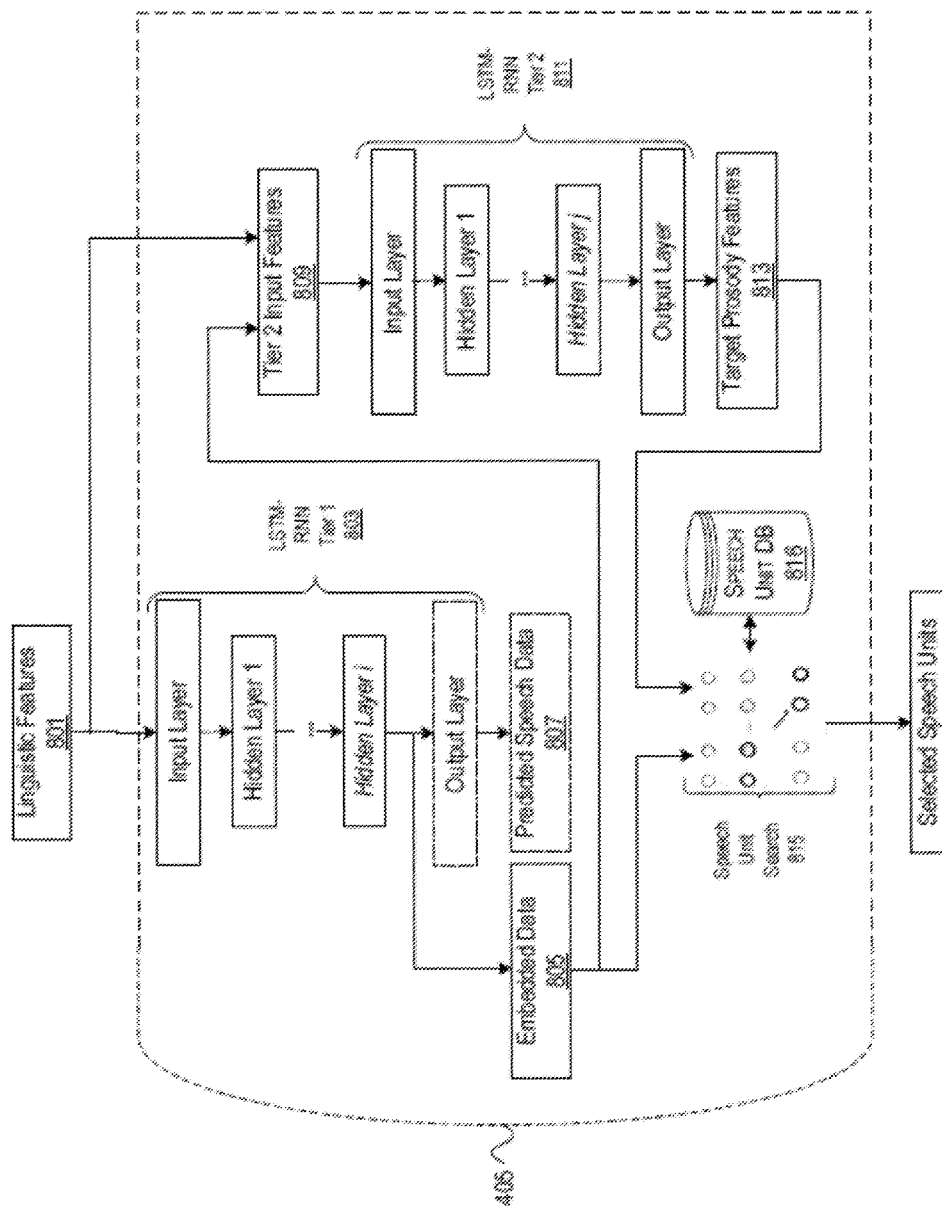
FIG. 8 depicts an example flow for determining speech data based on a two-tiered arrangement of LSTM-RNNs according to one or more aspects described herein.
Figure 9:
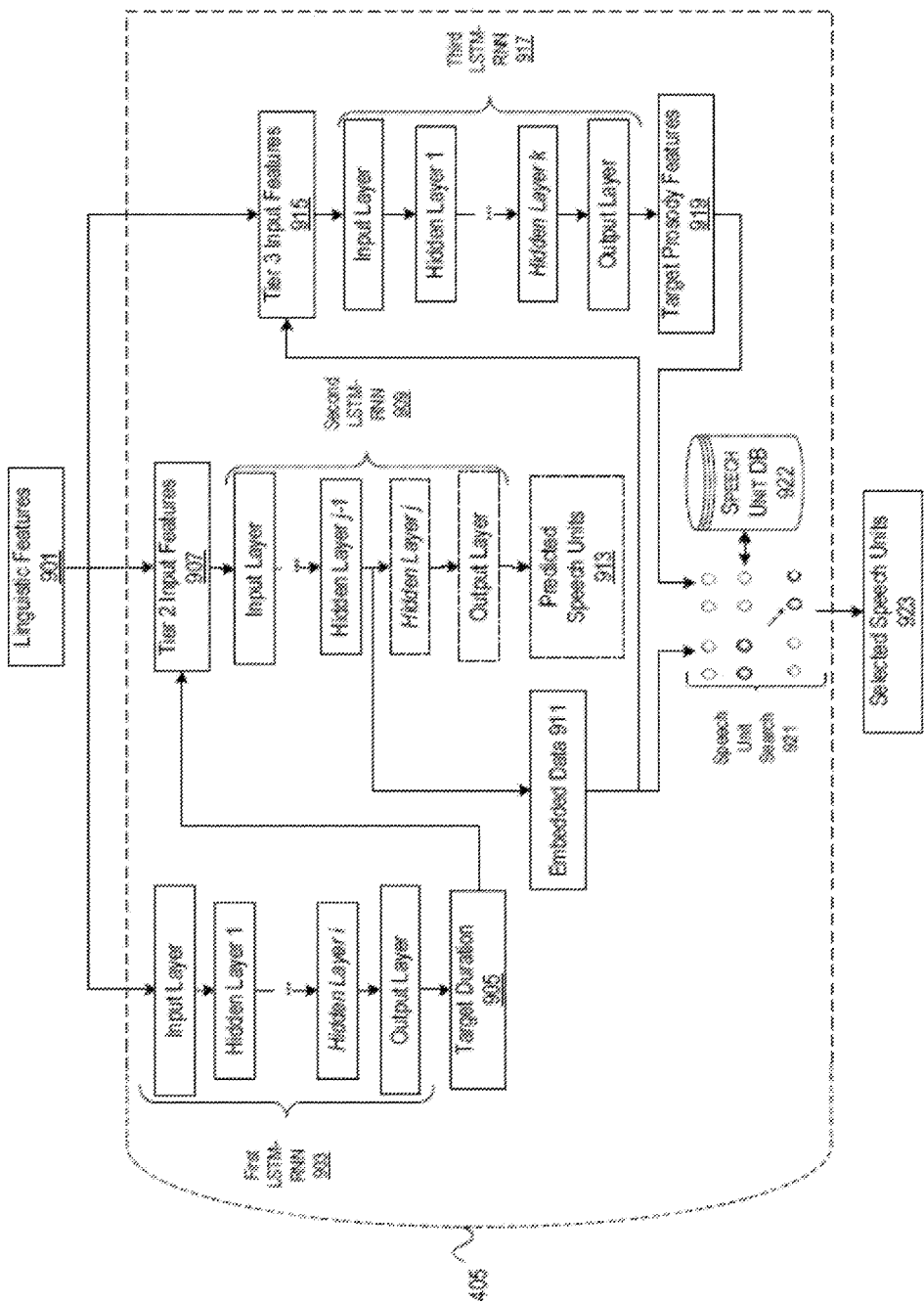
FIG. 9 depicts an example flow for determining speech data based on a three-tiered arrangement of LSTM-RNNs according to one or more aspects described herein.

While FIG. 5 illustrated an arrangement that uses two stages of LSTM-RNN, FIGS. 8 and 9 illustrate arrangements that use tiers of LSTM-RNNs. FIGS. 6 & 7 illustrate some high-level differences between the operation of the two-stage arrangement of FIG. 5 and the tiered arrangements of FIGS. 8 and 9. In particular, FIG. 6 depicts an example method for determining speech data based on two stages of LSTM-RNNs. FIG. 7 depicts an example method for determining speech data based on use of a tiered arrangement of LSTM-RNNs.

With respect to FIG. 6, beginning at step 601, a computing device may determine embedded data using a first LSTM-RNN. The processes of step 601 were discussed above in connection with FIG. 5 and, particularly, in connection with the determination of the embedded data 505 by the first LSTM-RNN 503.

At step 603, the computing device may determine unit-level speech data using the first LSTM-RNN. The processes of step 603 were discussed above in connection with FIG. 5 and, particularly, in connection with the determination of the first subset of speech data 513 by the first LSTM-RNN 503.

At step 605, the computing device may determine selected speech units based on a speech unit search. The processes of step 605 were discussed above in connection with FIG. 5 and, particularly, in connection with the determination of the selected speech units 509 based on the speech unit search 507.

At step 607, the computing device may determine frame-level speech data using a second LSTM-RNN. The processes of step 607 were discussed above in connection with FIG. 5 and, particularly, in connection with the determination of the second subset of speech data 513 by the second LSTM-RNN 511.

With respect to FIG. 7, at step 701, a computing device may determine embedded data, target prosody features and/or target duration features. The processes of step 701 are discussed in connection with the BLSTM-RNNs of FIGS. 8-10.

At step 703, the computing device may determine speech data based on a speech unit search. The processes of step 703 are discussed in connection with the speech unit searches of FIGS. 8 and 9.

FIG. 8 depicts an example flow for determining speech data based on a two-tiered arrangement of LSTM-RNNs. In the illustrated flow, the two-tiered arrangement includes a first tier for generating embedded data 805 and a second tier for predicting target prosody features 813. The first tier includes a first LSTM-RNN 803, and the second tier includes a second LSTM-RNN 811.

The first LSTM-RNN 803 processes linguistic features 801 and, as output, predicts speech data 807. The predictions of the first LSTM-RNN 803 may be at the unit-level. In particular, the linguistic features 801 are input to the first LSTM-RNN 803. The first LSTM-RNN 803 processes the linguistic features 801 via an input layer, one or more hidden layers, and an output layer. The first LSTM-RNN 803 is shown as having i hidden layers. In one particular example, the first LSTM-RNN 803 may take 148 linguistic features as input, which may be unrolled to 355 input values representing one-hot vectors and numeric features. The output layer of the first LSTM-RNN 803 produces the predicted speech data 807. The predicted speech data 807 may include state-level or unit-level speech data.

Notably, in the illustrated arrangement, the predicted speech data 807 is not used at runtime. Thus, the output layer of LSTM-RNN 803 and the predicted speech data 807 are shown with broken lines. The output layer and predicted speech data 807 may be used during training of LSTM-RNN 803 and/or for preparing the LSTM-RNN 803 for runtime. Instead of using predicted speech data 807, embedded data 805 may be extracted from activations of a hidden layer of LSTM-RNN 803 and used in two ways. The embedded data 805 may be used as input to a speech unit search 815 and may be used as input to the second tier of LSTM-RNNs. The input to the second tier of LSTM-RNNs is illustrated as tier 2 input features 809.

The embedded data 805 may be vectors of SUEs and may be determined from activations by one of the hidden layers of the first LSTM-RNN 803. The depiction of FIG. 8 shows embedded data 805 being extracted based on the activations of hidden layer i. However, the embedded data 805 could be extracted from the activations of a different hidden layer. For example, the first LSTM-RNN 803 may include four hidden LSTM layers and the embedded data 805 may be determined from activations from the third hidden layer (e.g., hidden layer i−1). The third hidden layer may have a smaller size than the other hidden layers of the first LSTM-RNN 803. The embedded data 805 and the linguistic features 801 may be used as input to the second LSTM-RNN 811 as tier 2 input features 809.

The second LSTM-RNN 811 processes the tier 2 input features 809 and, as output, predicts target prosody features 813 including, for example, log-f0 and duration. The second LSTM-RNN 811 processes the tier 2 input features 809 via an input layer, one or more hidden layers, and an output layer. The second LSTM-RNN 811 is shown as having j hidden layers. In some variations, the second LSTM-RNN 811 may include three hidden LSTM layers, or less hidden layers than those of LSTM-RNN 803.

The embedded data 805 and the target prosody features 813 may be used to search for matching speech units in the speech unit database 816. The speech unit search 815 may be performed by attempting to select, from the speech unit database 816, a sequence of speech units based on the embedded data 805 and based on the target prosody features 813. More particularly, in some variations, the speech unit search 815 may attempt to select, from the speech unit database 816, a sequence of speech units that minimizes speech unit, prosody and unit join metrics. The speech unit search 815 may be performed similarly to the speech unit search discussed in connection with FIG. 5 or FIG. 9. The selected speech units 817 may form the speech data determined by step 405 of FIG. 4. The selected speech units 817 may include, for example, the raw data of the selected speech units or identifiers for the selected speech units (e.g., identifiers or values of the speech units selected or matched by the speech unit search 815).

The speech unit search may be refined based on the target prosody features 813. For example, in one or more variations, matching the embedded data 805 to the speech units may result in a set of candidate speech units, each with associated losses. The set of candidates may be pruned as part of the search by removing those with the heaviest or greatest loss. After pruning, the losses of the remaining candidates can be adjusted based on one or more losses for one or more pitch vectors and the best candidate can be selected following the adjustment.

FIG. 9 depicts an example flow for determining speech data based on a three-tiered arrangement of LSTM-RNNs. In the illustrated flow, the three-tiered arrangement includes a first tier for predicting target duration 905, a second tier for generating embedded data 911, and a third tier for predicting target prosody features 919. The first tier includes a first LSTM-RNN 903 associated with the phone-level, the second tier includes a second LSTM-RNN 909 associated with the unit-level, and the third tier includes a third LSTM-RNN 917 associated with the frame-level.

The first LSTM-RNN 903 processes linguistic features 901 and, as output, predicts target duration 905. The target duration 905 may be at the phone-level. The first LSTM-RNN 903 processes the linguistic features 901 via an input layer, one or more hidden layers, and an output layer. The first LSTM-RNN 903 is shown as having i hidden layers. In one particular example, the first LSTM-RNN 903 may take 367 unrolled input values representing one-hot vectors and numeric features. The target duration 905 and the linguistic features 901 may be used as input to the second LSTM-RNN 909 as tier 2 input features 907. The up-sampling ratio from the phone-level first tier to the unit-level second tier may be 1:3, in a case of 3 units per phoneme.

The second LSTM-RNN 909 processes the tier 2 input features 907 and, as output, predicts speech units 913. The predictions of the second LSTM-RNN 909 may be at the unit-level. In particular, the tier 2 input features 907 are input to the second LSTM-RNN 909. The second LSTM-RNN 909 processes the tier 2 input features 907 via an input layer, one or more hidden layers, and an output layer. The second LSTM-RNN 909 is shown as having j hidden layers. In one particular example, the LSTM-RNN 909 may take 370 input values which represent the target duration 905 and the unrolled values of the linguistic features 901. The output layer of the second LSTM-RNN 909 produces the predicted speech units 913. The predicted speech units 913 may include acoustic parameters including, for example, mean mel-cepstral coefficients, the mean continuous log-f0, variance of continuous log-f0, phone duration, voicing type, message style, message domain type, language type, and the like. The predicted speech units 913 may be expressed as a combination of one or more numeric values and, for each style and type category, a one-hot vector.

In the illustrated arrangement, the predicted speech data 913 is not used at runtime. Thus, the output layer of LSTM-RNN 909 and the predicted speech data 913 are shown with broken lines. The output layer and predicted speech data 913 may be used during training of LSTM-RNN 909 and/or for preparing the LSTM-RNN 909 for runtime. Instead of using predicted speech data 913, embedded data 911 may be extracted from activations of a hidden layer of LSTM-RNN 909 and used in two ways. The embedded data 911 may be used as input to a speech unit search 921 and may be used as input to the third tier of LSTM-RNNs. The input to the third tier of LSTM-RNNs is illustrated as tier 3 input features 915. The up-sampling ratio from the unit-level second tier to the frame-level third tier may be 1:2.

The embedded data 911 may be vectors of SUEs and may be determined from activations by one of the hidden layers of the second LSTM-RNN 909. In one particular example, the second LSTM-RNN 909 may have four hidden BLSTM layers of sizes 256, 256, 160 and 256, respectively, and the embedded data 911 may be determined from activations from the third, or smallest, hidden layer (e.g., hidden layer j−1). The depiction of FIG. 9 shows embedded data 911 being extracted based on the activations of hidden layer j−1. However, the embedded data 911 could be extracted from the activations of a different hidden layer (e.g., j−2 or j). Additionally, by auto-encoding the target duration as input to the second tier, the embedded data 911 may be based on the target duration 905. Thus, having to manage separate unit selection sub-costs for duration may be avoided.

The third LSTM-RNN 917 processes the tier 3 input features 915 and, as output, predicts target prosody features 919 at the frame-level. The target prosody features 919 may include, for example, log-f0 values. The third LSTM-RNN 917 processes the tier 3 input features 915 via an input layer, one or more hidden layers, and an output layer. The third LSTM-RNN 917 is shown as having k hidden layers. In some variations, the third LSTM-RNN 917 may include three hidden BLSTM layers of sizes 384, 192 and 64, respectively.

The embedded data 911 and the target prosody features 919 may be used to search for matching speech units in the speech unit database 922. The speech unit search 921 may be performed by attempting to select, from the speech unit database 922, a sequence of speech units based on the embedded data 911 and based on the target prosody features 919. In some variations, the speech unit search 921 may attempt to select, from the speech unit database 922, a sequence of speech units that minimizes speech unit, prosody and unit join metrics. The sequence of speech units is illustrated by selected speech units 923. In some arrangements, the selected speech units 923 may be the best unit sequence resulting from the speech unit search 921. The selected speech units 923 may form the speech data determined by step 405 of FIG. 4. The selected speech units 923 may include, for example, the raw data of the selected speech units or identifiers for the selected speech units (e.g., identifiers or values of the speech units selected or matched by the speech unit search 921).

The speech unit search 921 may be implemented as a dynamic programming optimization that determines the selected speech units 923 based on a concatenation of the target speech units 911 and the target prosody features 919. The dynamic programming optimization may include computing the arguments that minimize a loss function.

An example dynamic programming optimization can be denoted as follows:

$$C^* = \underset{C}{\arg\min} f(\tilde{G}, C)$$

where the selected speech units 923 are denoted as C*; the loss function is denoted as $f$; a concatenation of the embedded data 911 and the target prosody features 919 is denoted as $\tilde{G}$; and the speech units within the speech unit database 922 are denoted as C. The loss function may include a target loss function, $f^t$, and a connection loss function, $f^c$. Thus, the loss function may be denoted as:

$$f(\tilde{G}, c \in C) = \sum_{t=1}^{T} f^t(\tilde{G}_t, c_t) + Q \sum_{t=2}^{T} f^c(c_{t-1}, c_t)$$

where Q is a regularization variable for balancing the contribution of the connection loss. The target loss function may formulated as follows:

$$f^t(\tilde{G}_t, c_t) = -\log P(c_t | \tilde{G}_t)$$

Applying the softmax function and using a similarly between vectors of the concatenation ($\tilde{G}$), vectors in the speech unit database 1022 ($c_t$), and a set of candidates ($k_t$) that includes $c_t$, results in the following:

$$P(c_t | \tilde{G}_t) = \frac{e^{sim(\tilde{G}_t, c_t)}}{\sum_{k_t \in K_t} e^{sim(\tilde{G}_t, k_t)}}$$

Using the cosine similarity, substitution and simplifying the denominator results in a target distance metric that satisfies the triangular inequality theorem:

$$f^t(\tilde{G}_t, c_t) \cong \frac{1}{\pi} \cos^{-1}\left(\frac{\tilde{G}_t^t c_t}{|\tilde{G}_t||c_t|}\right)$$

The connection loss function may be a Markov process after applying a class of boundary functions, r, to edges of speech units, such as the following:

$$f^c(c_{t-1}, c_t) = -\log P(r_L(c_t) r_R(c_{t-1}))$$

The boundary functions resulting into co-occurrence observations may be obtained by another neural network that learns to classify join types from a family of acoustic features. The conditional probabilities of the resulting co-occurrence observations can be modeled by a probabilistic model or a connection neural network.

Figure 10:
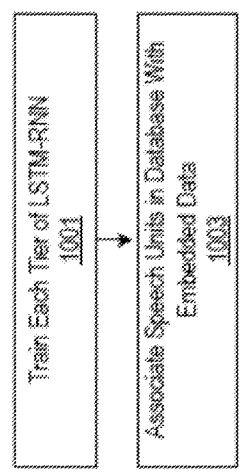
FIG. 10 depicts an example method for training a tiered arrangement of LSTM-RNNs and preparing the tiered arrangement of LSTM-RNNs for runtime according to various aspects described herein.

FIGS. 8 and 9 describe two different tiered arrangements of LSTM-RNNs and each of these tiered arrangements includes a speech unit search. Thus, each tiered arrangement of LSTM-RNNs will need to be trained and prepared for runtime. FIG. 10 depicts an example method for training a tiered arrangement of LSTM-RNNs and preparing the tiered arrangement of LSTM-RNNs for runtime.

At step 1001, a computing device may train each tier of LSTM-RNN. The process of step 1001 may be performed as an off-line process that iteratively trains the model of each LSTM-RNN and validates the output based on a set of ground truth speech units or other type of speech data. For the arrangement of FIG. 8, step 1001 may include training two tiers of LSTM-RNN. For the arrangement of FIG. 9, step 1001 may include training three tiers of LSTM-RNN. The training of each LSTM-RNN within each tier may be performed by a method similar to the example method of FIG. 3. With respect to the second tier of the arrangement of FIG. 10, its training may include auto-encoding, regression to acoustic output features and classification of message types. Additionally, as will become apparent in view of the depicted flow, the training that is performed at step 1001 may require additional configuration of the tiered arrangement of LSTM-RNNs.

At step 1003, the computing device may associate speech units in the speech unit database with embedded data. The process of step 1003 may be performed as an off-line process that annotates or otherwise associates the speech units in the speech unit database (e.g., speech unit database 508, 816 or 922) with embedded data (e.g., embedded data 505, 805 and 911). This may involve an iterative process where linguistic features for known phonemes are processed via one or more LSTM-RNNs, embedded data is extracted from one of the LSTM-RNNs, and the embedded data is associated with one or more speech units in a speech unit database. The one or more speech units may be known to correspond to the particular phoneme being processed at the current iteration. The process may repeat for the next known phoneme until all speech units are annotated or otherwise associated with at least one instance of the embedded data 911. Based on the annotation process at step 1003, in some variations, each speech unit in the database may be annotated with or otherwise associated with a SUE vector. In some arrangements, target prosody features (e.g., 919) may also be used as a basis for the annotations that occur at step 1003. This offline process may be performed in connection with preparing the speech unit search for runtime. Further, as will become apparent in view of the depicted flow of FIG. 12, the annotation that is performed at step 1003 may require additional configuration of the tiered arrangement of LSTM-RNNs.

Figure 11:
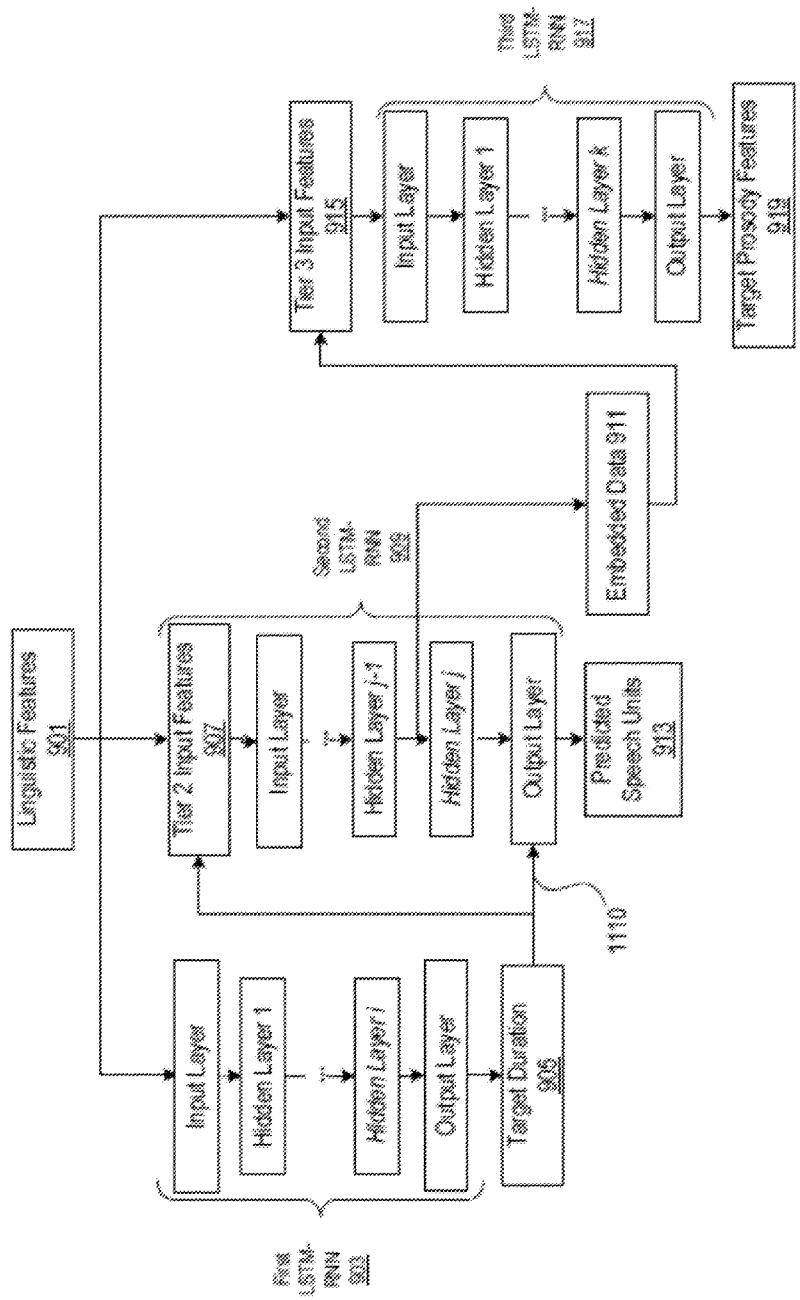
FIG. 11 depicts an example flow for training a tiered arrangement of LSTM-RNNs according to one or more aspects described herein.

As discussed above in connection with step 1001 of FIG. 10, training a tiered arrangement of LSTM-RNNs may require additional configuration of the LSTM-RNNs. FIG. 11 depicts an example flow for training a tiered arrangement of LSTM-RNNs. For clarity, FIG. 11 depicts the configuration of the three tiered arrangement of LSTM-RNNs from FIG. 9. Thus, where appropriate, the various components of the three tiered arrangement of LSTM-RNNs share labels with those of FIG. 9, and are configured similarly to the depicted flow of FIG. 9. However, a few differences in configuration can be seen if the depiction of FIG. 11 is compared to the depiction of FIG. 9. For example, during training, the target duration 905 may be input to the output layer of the second LSTM-RNN 909. This is illustrated in FIG. 11 at connection 1110 in FIG. 11, which is not present in FIG. 9. Based on the target duration 904 from being input to the output layer via connection 1110, the model for the second LSTM-RNN 909 may be trained based on the target duration 905. As another example of differences between the depicted flows of FIG. 9 and FIG. 11, the output layer of the second LSTM-RNN 909 and the predicted speech units are used in the depicted flow of FIG. 11. This is illustrated in FIG. 11 by the output layer of the second LSTM-RNN 909 and the predicted speech units being in solid lines. Additionally, any validation that may be performed during the various iterations of the training processes for the second LSTM-RNNs 909 and the third LSTM-RNN 917 may be performed based on the predicted speech units 913 and the target prosody features 919, respectively.

Figure 12:
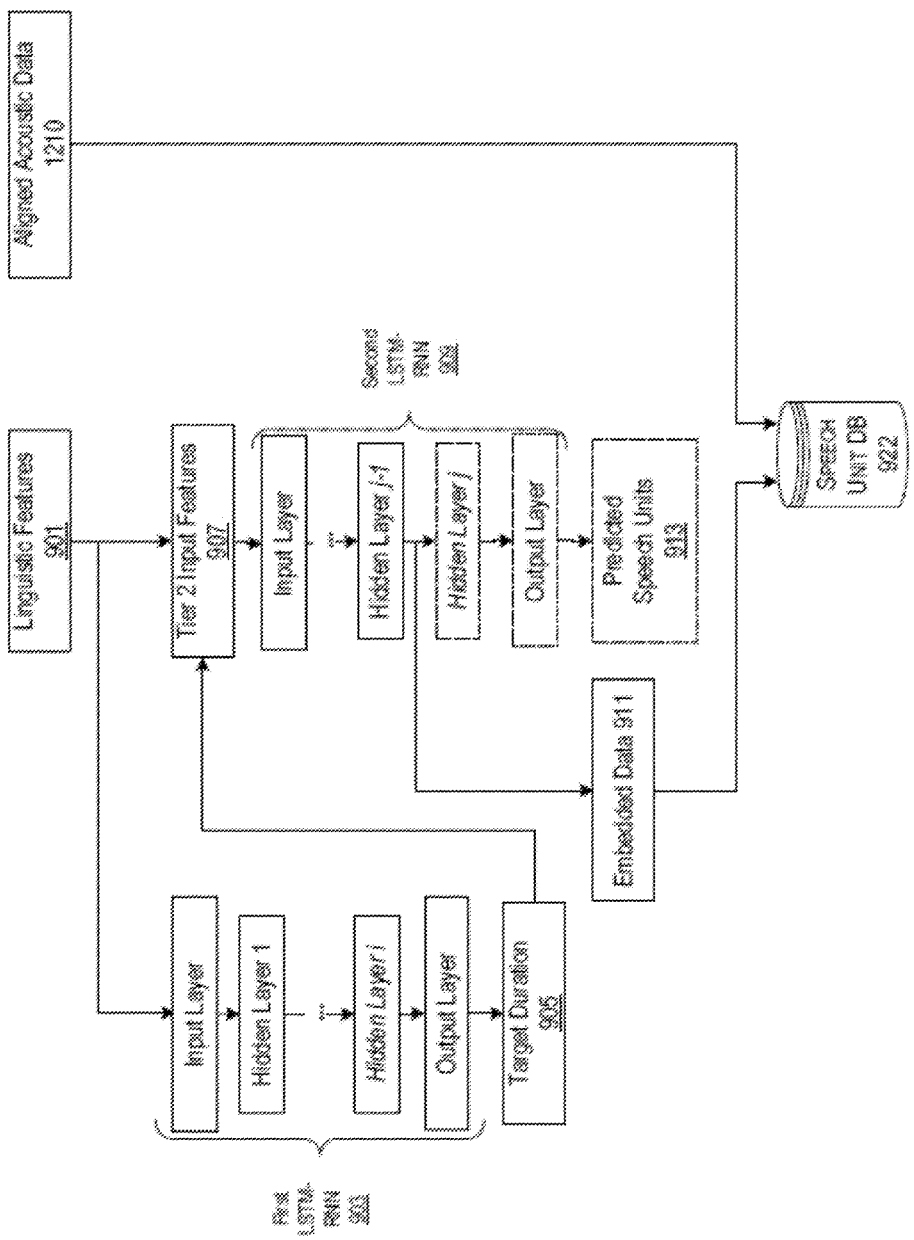
FIG. 12 depicts an example flow for preparing a tiered arrangement of LSTM-RNNs for runtime according to various aspects described herein.

As discussed above in connection with 1003 with FIG. 10, annotating a speech unit database may require additional configuration of the LSTM-RNNs. FIG. 12 depicts an example flow for preparing a tiered arrangement of LSTM-RNNs for runtime. For clarity, FIG. 12 depicts the configuration of the three tiered arrangement of LSTM-RNNs from FIG. 9. Thus, where appropriate, the various components of the three tiered arrangement of LSTM-RNNs share labels with those of FIG. 9, and are configured similarly to the depicted flow of FIG. 9. However, a few differences in configuration can be seen if the depiction of FIG. 12 is compared to the depiction of FIG. 9. For example, during the annotation process that annotates the embedded data 911 to the speech units of speech unit database 922, any hidden layers after the extraction layer for the embedded data 911 are not used. Thus, hidden layer j of the second LSTM-RNN 909, the output layer of the second LSTM-RNN 909, and the predicted speech units 913 are illustrated with broken lines. As another example of differences between the depicted flows of FIG. 9 and FIG. 12, the annotation is based on aligned acoustic data 1210. Additionally, the third LSTM-RNN 917 is not used during the example annotation configuration of FIG. 12. Thus, the third LSTM-RNN 917, its inputs and outputs are not shown in FIG. 12. In the illustrated example of FIG. 12, linguistic features 901 may be processed by the first LSTM-RNN 903 and the second LSTM-RNN 909 in the manner shown. The linguistic features 901 may include features for a particular phoneme that was uttered by a predetermined speaker. The embedded data 911 may be extracted upon activation of one of the hidden layers of the second LSTM-RNN 909 and used to annotate or otherwise associate with one or more speech units in the speech unit database 922. This process may be repeated until the linguistic features for all desired phonemes have been processed and/or until each speech unit in the speech unit database 922 is annotated or associated with at least one instance of the embedded data 911.

In controlled experiments, the arrangement depicted by FIGS. 8 and 9 showed improvements over the performance of an HMM-based reference synthesis system (e.g., a hybrid text-to-speech system based on HMMs). For achieving the following experimental results, an experimental arrangement similar to FIG. 9 and the reference synthesis system were prepared in the same manner. For the corpus of speech data, a large American English female speech database of formal and conversational speaking styles and including various subdomains, such as navigation, weather forecast, greetings, numbers, etc. was used. The 22 kHz speech signals were analyzed with a window of 24 milliseconds and a frameshift of 8 milliseconds. Acoustic analysis resulted into log-f0, voicing, 34th order mel-cepstrum and speech excitation parameters. The data was split into a training set of 84%, a validation set of 15% and 1% was held out as a set of out-of-training data. Accordingly both the experimental arrangement and the reference synthesis system shared the same data set, speech analysis, unit alignment, size of unit-level (e.g., one third of a phone) and linguistic processing functions.

For the experimental arrangement, the tiers were trained based on stochastic gradient descent. The network weights were initially randomized according a normal with mean equal to 0 and standard deviation equal to 0.1. The training was stopped after 20 epochs of no improvements on the validation set or in case a specified maximum number of epochs was reached. The lingcode function extracts and normalizes a 367 dimensional vector as the linguistic features. The first tier of the experimental arrangement had three hidden BLSTM layers of sizes 256, 160, 40. The output of the first tier was current, left and right phoneme duration expressed in log seconds. The second tier had four hidden BLSTM layers of sizes 256, 256, 160 and 256, with the target speech units being extracted from the third hidden layer. The output of the second tier included mel-cepstral coefficients, the mean continuous log-f0, variance of continuous log-f0, phone duration, voicing type, message style and message domain type vectors. The third tier had three hidden BLSTM layers of sizes 384, 192 and 64. The output of the third tier included log-f0 values In the following table, the results of objective analysis are reported. The results are expressed in terms of distance between real and predicted acoustic features and/or features from SUE vectors. The distance is computed in terms of cross-correlation (XCOR) and root mean squared error (RMSE). The targets predicted by the experimental arrangement ("Proposed") and the reference synthesis system ("Baseline") were compared with the ground-truth of the set of out-of-training data, which was unit-aligned and labeled with frame-level log-f0 values. The distances for phone durations and unit-level average log-f0 of the selected unit sequences were also calculated.

| System | Target | RMSE | XCOR |
| --- | --- | --- | --- |
| Baseline | logF0 | $0.1622 \pm 0.0365$ | $0.5142 \pm 0.2047$ |
| Proposed | | $0.1464 \pm 0.0262$ | $0.6226 \pm 0.1109$ |
| | | (−12%) | (+21%) |
| Baseline | pDur | $0.0487 \pm 0.0153$ | $0.5861 \pm 0.1744$ |
| Proposed | | $0.0429 \pm 0.0104$ | $0.6993 \pm 0.0948$ |
| | | (−10%) | (+19%) |

As shown, a 21% and 19% increase in XCOR and a 12% and 10% decrease in RMSE for log-f0 and phone duration (pDur) was obtained with the proposed system over the reference synthesis system.

For subjective analysis, a mean opinion score (MOS) test was performed using 30 English-native test subjects. The test stimuli included 59 synthesized sentences of various lengths, and the subjects were asked to judge the overall quality on the basis of a 5 point scale (1 being very poor and 5 being excellent). The experimental arrangement had a score of 3.94, while the reference synthesis system had a score of 3.82.

For an additional subjective analysis, a stability test was performed. For the test, two categories of defects were defined: prosody defects and smoothness defects, each having two degrees of severity. A large set of input text containing various types was used to synthesize samples with both systems. Experts in the field of speech synthesis equipped with high quality headphones listened in randomized order and annotated the degrees and categories of perceived defects by marking up the corresponding areas in the input text. The defects were weighted and summed over listeners and per sample to provide normalized scores. Defects jointly marked by the experts were heavier weighted. The experimental arrangement outperformed the reference synthesis system by reducing the number of weight smoothness defects by 39% and weighted prosody defects by 38%.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

The invention claimed is:

1. A method comprising:
   receiving text input;
   determining unit-level features based on the text input;
   providing the features as input to a unit-level recurrent neural network (RNN);
   determining, by a computing device, unit-level embedded data from one or more activations of a hidden layer of the RNN, the RNN during training having an input layer, one or more hidden layers including said hidden layer, and an output layer;
   providing an input to a frame-level recurrent neural network based on an output of the unit-level recurrent neural network, the frame-level recurrent neural network producing successive frame-level outputs corresponding to respective acoustic frames of speech output;
   determining speech data based on a speech unit search, wherein the speech unit search selects, from a database, speech units using the unit-level embedded data as an input to the speech unit search,
   and wherein the speech data further depends on the successive frame-level outputs;
   and
   causing speech output to be generated based on the speech data.

2. The method of claim 1, wherein the one or more activations of the hidden layer of the unit-level RNN comprises an activation of a hidden layer of a long short term memory RNN (LSTM-RNN).

3. The method of claim 1, wherein the embedded data comprises one or more vectors of speech unit embeddings (SUEs).

4. The method of claim 1, wherein the RNN is a first RNN, and wherein the method further comprises
   providing the features and the embedded data as input to a second RNN;
   determining target prosody features using the second RNN; and
   wherein the speech unit search is performed using the embedded data and the target prosody features as inputs to the speech unit search.

5. The method of claim 1, wherein the RNN is a second RNN, and wherein the method further comprises
   providing the features as input to a first RNN;
   determining target duration from output of the first RNN;
   providing the target duration as input to the second RNN;
   providing the features and the embedded data as input to a third RNN;
   determining target prosody features from output of the third RNN;
   wherein the speech unit search is performed using the embedded data and the target prosody features as inputs to the speech unit search.

6. The method of claim 1, wherein the speech unit search comprises a dynamic programming optimization that minimizes a loss function.

7. The method of claim 1, wherein causing the speech output to be generated based on the speech data comprises:
determining a waveform based on the speech data; and
generating the speech output based on the waveform.

8. An apparatus comprising:
one or more processors; and
memory storing executable instructions that, when executed by the one or more processors, cause the apparatus to:
receive text input;
determine unit-level features based on the text input;
provide the features as input to a unit-level recurrent neural network (RNN);
determine unit-level embedded data from one or more activations of a hidden layer of the RNN, the RNN during training having an input layer, one or more hidden layers including said hidden layer, and an output layer;
provide an input to a frame-level recurrent neural network based on an output of the unit-level recurrent neural network, the frame-level recurrent neural network producing successive frame-level outputs corresponding to respective acoustic frames of speech output;
determine speech data based on a speech unit search, wherein the speech unit search selects, from a database, speech units using the unit-level embedded data as an input to the speech unit search, and wherein the speech data further depends on the successive frame-level outputs; and
cause speech output to be generated based on the speech data.

9. The apparatus of claim 8, wherein the one or more activations of the hidden layer of the unit-level RNN comprises an activation of a hidden layer of a long short term memory RNN (LSTM-RNN).

10. The apparatus of claim 8, wherein the embedded data comprises one or more vectors of speech unit embeddings (SUEs).

11. The apparatus of claim 8, wherein the unit-level RNN is a first RNN, and the frame-level RNN is a second RNN, and wherein the executable instructions, when executed by the one or more processors, cause the apparatus to:
determine target prosody features using the second RNN; and
wherein the speech unit search is performed using the unit-level embedded data and the target prosody features as inputs to the speech unit search.

12. The apparatus of claim 8, wherein the unit-level RNN is a second RNN, and the frame-level RNN is a third RNN, and wherein the executable instructions, when executed by the one or more processors, cause the apparatus to:
provide the features as input to a first RNN;
determine target duration from output of the first RNN;
provide the target duration as input to the second RNN;
determine target prosody features from output of the third RNN;
wherein the speech unit search is performed using the unit-level embedded data and the target prosody features as inputs to the speech unit search.

13. The apparatus of claim 8, wherein the speech unit search comprises a dynamic programming optimization that minimizes a loss function.

14. The apparatus of claim 8, wherein causing the apparatus to cause the speech output to be generated based on the speech data comprises causing the apparatus to:
determine a waveform based on the speech data; and
generate the speech output based on the waveform.

15. One or more non-transitory computer-readable storage media storing executable instructions that, when executed cause an apparatus to perform operations comprising: receiving text input; determining unit-level features based on the text input; providing the features as input to a unit-level recurrent neural network (RNN), the RNN during training having an input layer, one or more hidden layers including said hidden layer, and an output layer; providing an input to a frame-level recurrent neural network based on an output of the unit-level recurrent neural network, the frame-level recurrent neural network producing successive frame-level outputs corresponding to respective acoustic frames of speech output; determining embedded data from one or more activations of a hidden layer of the RNN; determining speech data based on a speech unit search, wherein the speech unit search selects, from a database, speech units using the embedded data as an input to the speech unit search, and wherein the speech data further depends on the successive frame-level outputs; and causing speech output to be generated based on the speech data.

16. The one or more non-transitory computer-readable storage media of claim 15, wherein the one or more activations of the hidden layer of the unit-level RNN comprises an activation of a hidden layer of along short term memory RNN (LSTM-RNN).

17. The one or more non-transitory computer-readable storage media of claim 16, wherein the embedded data comprises one or more vectors of speech unit embeddings (SUEs).

18. The one or more non-transitory computer-readable storage media of claim 15, wherein the unit-level RNN is a first RNN, and the frame-level RNN is a second RNN, and wherein the operations further comprise: determining target prosody features using the second RNN; and wherein the speech unit search is performed using the unit-level embedded data and the target prosody features as inputs to the speech unit search.

19. The one or more non-transitory computer-readable storage media of claim 15, wherein the unit-level RNN is a second RNN, and the frame-level RNN is a third RNN, and wherein the operations further comprise; providing the features as input to a first RNN; determining target duration from output of the first RNN; providing the target duration as input to the second RNN; determining target prosody features from output of the third RNN; wherein the speech unit search is performed based on the unit-level embedded data and the target prosody features, and wherein the speech unit search comprises a dynamic programming optimization that minimizes a loss function.

20. The one or more non-transitory computer-readable storage media of claim 15, wherein the operations further comprise: determining a waveform based on the speech data; and generating the speech output based on the waveform.

* * * * *